United States Patent
Schiffmann

(10) Patent No.: US 7,727,604 B2
(45) Date of Patent: Jun. 1, 2010

(54) SMOKEABLE PLANAR OR TUBULAR-SHAPED FOOD COVERING OR FILM FOR FOOD PACKAGINGS, AND METHOD FOR THE PRODUCTION THEREOF

(75) Inventor: Jürgen Schiffmann, Hennef-Rott (DE)

(73) Assignee: Kuhne Antagenbau GmbH, St. Augustin/ Menden (DE)

( * ) Notice: Subject to any disclaimer, the term of this patent is extended or adjusted under 35 U.S.C. 154(b) by 1188 days.

(21) Appl. No.: 10/557,910

(22) PCT Filed: Mar. 17, 2004

(86) PCT No.: PCT/EP2004/002767

§ 371 (c)(1), (2), (4) Date: Nov. 22, 2005

(87) PCT Pub. No.: WO2004/103079

PCT Pub. Date: Dec. 2, 2004

(65) Prior Publication Data

US 2007/0054013 A1    Mar. 8, 2007

(30) Foreign Application Priority Data

May 23, 2003 (DE) .................. 103 23 417

(51) Int. Cl.
  *A22C 13/00*  (2006.01)
  *B29D 22/00*  (2006.01)
  *B29D 23/00*  (2006.01)

(52) U.S. Cl. .................. 428/34.8; 428/34.3; 428/35.7; 428/36.7; 426/105; 426/118; 426/113

(58) Field of Classification Search .................. 426/135; 428/500, 40.1, 480
See application file for complete search history.

(56) References Cited

U.S. PATENT DOCUMENTS

| | | |
|---|---|---|
| 4,786,512 A | 11/1988 | Erk et al. |
| 6,406,797 B1 | 6/2002 | VanPutte |
| 2003/0194566 A1 * | 10/2003 | Corzani et al. ........... 428/424.2 |
| 2004/0047951 A1 * | 3/2004 | Johansson ................... 426/105 |

FOREIGN PATENT DOCUMENTS

| | | | |
|---|---|---|---|
| DE | 30 29 028 A1 | | 2/1982 |
| DE | 35 26 394 A1 | | 2/1987 |
| DE | 42 20 957 A1 | | 1/1994 |
| DE | 199 42 835 A1 | | 3/2001 |
| DE | 10208858 .6 | * | 3/2002 |
| EP | 0 216 094 A1 | | 8/1985 |
| EP | 1 193 289 A1 | | 4/2002 |
| JP | 64-13940 A | | 1/1989 |

* cited by examiner

*Primary Examiner*—Rena L Dye
*Assistant Examiner*—Ellen S Wood
(74) *Attorney, Agent, or Firm*—The Nath Law Group

(57) ABSTRACT

The present invention proposes a smokable planar or hose-type food casing or food casing film for food packagings, such as, e.g., sausage casings, shrink bags or the like on polymer basis, which is for the first time manufactured in the jet-blasting process from a homogeneous molten plastic material consisting of a plastic mixture consisting of at least of PA (polyamide) with PVAL (polyvinyl alcohol) and PEBAX (polyether block amide). The food casing or food casing film has a water vapor permeability that is at least 1 kg/m$^2$ within 24 h. Its oxygen permeability at a film thickness of 30 μm is less than 2.1 cm$^3$/m$^2$ within 24 h. Moreover the present invention for the first time proposes a method for manufacturing it.

11 Claims, No Drawings

SMOKEABLE PLANAR OR TUBULAR-SHAPED FOOD COVERING OR FILM FOR FOOD PACKAGINGS, AND METHOD FOR THE PRODUCTION THEREOF

The present invention relates to a smokable planar or hose-type food casing or food casing film for food packagings, such as, e.g., sausage casings, shrink bags or the like on polymer basis as well as a method for manufacturing it.

Smokable sausage casings are known from practice and from literature. Thus DE 199 42 835 A1 teaches a sausage casing of an artificial sausage casing material, for which purpose a gas and oxygen permeable, soft plastic material is to be employed. The sausage casing material described in DE 199 42 835 A1 has an irregularly curved sausage shape with welded longitudinal seams. This sausage casing is said to be smokable and have a sufficiently high strength for this purpose.

There is moreover known from DE 198 30 389 A1 a film for air-drying, smokable foodstuffs. Furthermore DE 101 25 762 A1 describes a shaped article having an irregular external contour, which is manufactured from a once-folded film material web of a weldable plastic in a welding and cutting machine for welding and separating the material webs. This cut-welded shaped article is said to result in a smokable sausage casing having a sufficiently high strength.

Moreover in DE 35 26 394 C2 a raw sausage casing is described which is said to be produced of a binder-free spun fleece of at least one polyamide joined together into a hose in the longitudinal direction. This raw sausage casing is said to be smokable. In DE 35 26 394 C2, reference is also made to DE 30 29 028 A1 that discloses a fiber fleece-reinforced artificial casing which is said to be smokable. The fibre fleece used for this purpose may be formed on a polyamide base. Particularly suited spun fleeces are to be on the basis of polyamide and polypropylene. The like spun fleeces are to be impregnated with a coating solution. Suitable coating materials in accordance with DE 30 29 028 A1 are, in turn, any film-forming polymers that are applied in the form of a powder and subsequently thermally melted into a film or applied as a coating in the form of a solution of molten material, suspension, or dispersion, and that may be formed into a film by subsequent drying. Suited coating materials mentioned are, i. a., molecular disperse or colloidal solutions or suspensions of various polymers by themselves or in mixtures, such as, e.g., polyvinyl alcohol.

DE 42 20 957 A1 finally discloses a packaging casing comprising a flexible carrier material provided with a foam layer. The coating material used for this purpose is to be fully saponified polyvinyl alcohol. The foam of this substance is said to be waterproof, grease-tight and substantially impermeable for oxygen, nitrogen and carbon dioxide. Merely water vapor may freely penetrate through the foam layer of fully saponified polyvinyl alcohol. Fully saponified polyvinyl alcohol is therefore said to be suited for sausage casings, in particular for raw sausages. Furthermore combinations including polyvinyl alcohol with other plastic dispersions are said to be conceivable.

Smokable polyamide-based food casings with polyvinyl alcohol are thus known from the prior art. These known smokable food casings must, however, revert to fiber fleeces or spun fleeces, nettings, or other carrier or support materials, on which it is then possible to apply coatings. The like known smokable sausage casings can not be manufactured on an industrial scale. They are moreover not suited for automated further processing, e.g, in large butcher's shops, owing to their low rigidity and thus low gathering suitability, and a dimensional stability that is unsatisfactory as a general rule.

Accordingly it is an object of the present invention to propose a smokable planar or hose-type food casing or food casing film for food packagings which may cost-efficiently be produced in large amounts from a molten plastic material in industrial mass production, and which may subsequently be further processed in an automated manner, as well as a method suited for this purpose.

What is proposed is a smokable planar or hose-type food casing or food casing film for food packagings, such as, e.g., sausage casings, shrink bags or the like, on polymer basis, which is for the first time formed in a jet-blasting process from a homogeneous molten plastic material consisting of a plastic mixture at least of PA (polyamide) with PVAL (polyvinyl alcohol) and PEBAX (polyether block amide). The plastic mixture preferably has a content of PA (polyamide) or of a mixture of polyamides of 40% (wt.) to 80% (wt.). The content of PVAL (polyvinyl alcohol) is from 5% (wt.) to 40% (wt.), and the content of PEBAX (polyether block amide) is between 20% (wt.) and 30% (wt.).

Moreover the smokable food casing or food casing film produced in the jet-blasting process has a water vapor permeability of at least 1 kg/m$^2$ within 24 h. The oxygen permeability within 24 h at a film thickness of 30 μm is less than 2.1 cm$^3$/m$^2$.

Thus not only the large-scale industrial manufacture of smokable planar or hose-type food casings or films for food packagings is advantageously enabled for the first time in the jet-blasting process, but it is possible to entirely do away with the nettings, flexible carrier materials, or spun fleeces from the prior art that are felt to be a particular drawback in large-series production, which particularly in the case of fiber fleeces or spun fleeces moreover frequently had to be condensed or quite generally coated at increased complexity without being able to sufficiently increase their rigidity, which made gathering very difficult and in particular rendered gathering of small calibers simply impossible without a netting. Accordingly, such known sausage casings were not suited for automated further processing, and this has not changed to the present day.

In contrast, the smokable planar or hose-type food casing or food casing film according to the invention exhibits an excellent strength or rigidity and thus gathering suitability, and is thus for the first time suited for automated further processing. Moreover it has at the same time a good water permeability at a concurrently high oxygen barrier, even at extremely low film thicknesses, so that it is moreover for the first time possible to manufacture particularly thin films, which is favorable for the subsequent smoking and optionally air-drying in the case of hard sausages or salamis.

The smokable planar or hose-type food casing or food casing film in accordance with the invention is characterized by a particularly good gathering suitability allowing, even at small calibers having a diameter of less than 30 mm, a ratio of extended length to gathered length of at least 100 m in the extended condition and 20 cm in the gathered condition. Moreover the casing or film in accordance with the invention has a very good dimensional stability, so that meat or sausage articles thereby produced may particularly well preserve a desired shape predetermined by the sausage casing after corresponding smoking steps, and optionally even after prolonged air-drying phases.

The extremely high oxygen barrier that may hereby be achieved, of less than 2.1 cm$^3$/m$^2$ within 24 h even at a film thickness of no more than 30 μm, not only results in a particularly good smokability of meat or sausage articles produced in such food casings or films in accordance with the invention, but the food casing or food casing film in accordance with the invention is at the same time particularly pliant and thus substantially better suited for automated processing, so that it may not only be manufactured in large-series production, but may correspondingly also be employed well in large butcher's shops under large-scale industrial conditions. Furthermore the smokable food casing or food casing film in accordance with the invention is also particularly well suited for raw sausages, such as, e.g., salami, and even maintains contact without the formation wrinkles if the stuffing was optionally, as an alternative, filled manually, i.e., without pressure or under only low pressure, i.e., without the use of dedicated filling machines.

The smokable planar or hose-type food casing or food casing film in accordance with the invention may advantageously have film thicknesses of 10 μm to 50 μm, wherein it is particularly well possible in the jet-blasting process to produce film thicknesses of 20 μm to 40 μm at calibers of up to 150 mm in diameter.

Meat or sausage articles produced with the smokable planar or hose-type food casing or food casing film for food packagings in accordance with the invention, such as, e.g., raw sausages and in particular salamis, lend themselves excellently for smoking and may be air-dried particularly well.

The selected plastic mixture of 40% (wt.) to 80% (wt.) PA (polyamide), 5% (wt.) to 40% (wt.) PVAL (polyvinyl alcohol) and 20% (wt.) to 30% (wt.) PEBAX (polyether block amide) for the first time allows the particularly good manufacture of a smokable planar or hose-type food casing or food casing film in the jet-blasting process, which thus for the first time satisfies all the requirements to a smokable sausage casing, e.g., for hot dogs or for salami. Thanks to the sausage casing or foodstuff film a maximum water vapor and smoke permeability is attained, with particularly the smoke permeability being of importance for the smoking process. At the same time a maximum possible rigidity is attained which is crucial for a good gathering process. The good dimensional stability demanded for an optimum filling process is also obtained by this sausage casing or foodstuff film. Even the demanded low adhesion of stuffing and the good peelability, that are influential for the later processing processes, may readily be achieved with the foodstuff film or sausage casing in accordance with the invention. Finally the desired high surface coloration of the sausage products that makes for the typical optical appearance of smoked sausage products is also maintained with the foodstuff film or sausage casing in accordance with the invention.

Various examinations and tests with the novel foodstuff film or sausage casing revealed various trends. Thus, a high content of PA (polyamide) is essentially necessary for a good dimensional stability and rigidity. Nevertheless there is a tradeoff between the high content of PA (polyamide) and the desired smoke permeability, surface coloration, and adhesion of stuffing. Namely, a high content of PA (polyamide) reduces the smoke permeability and the surface coloration and at the same time brings about a possibly higher adhesion of stuffing than desired.

It was furthermore found that owing to the addition of PEBAX (polyether block amide), the water vapor and smoke permeability can be strongly improved and at the same time the peelability may be optimized decisively. Here it is, however, not possible yet to finally adjust the desired high water vapor and smoke permeability solely by the addition of PEBAX (polyether block amide). Neither can the surface coloration yet be adapted to full satisfaction solely by the addition of PEBAX (polyether block amide). Moreover the dimensional stability and the rigidity may be degraded by faulty apportioning of PEBAX (polyether block amide), so that there is an additional tradeoff in this respect.

Here it was, however, surprisingly found that owing to the mixture of PVAL or PVOH (polyvinyl alcohol) with PEBAX (polyether block amide) and PA (polyamide), it was for the first time possible to create a plastic mixture that results in the desired high water vapor and smoke permeability and furthermore ensures a high surface coloration at the selection and dosage, respectively, of the mixture constituents in accordance with the invention. Moreover a substantially higher rigidity is obtained, and the adhesion of stuffing is further reduced. The dimensional stability moreover maintains optimum adjustability with the plastic mixture of the invention.

Further advantageous developments and aspects of the invention result from the features of the subclaims.

According to a preferred embodiment of the smokable food casing or food casing film for food packagings, the content of PA (polyamide) is from 45 to 75% (wt.), preferably from 50 to 65% (wt.). The content of PVAL (polyvinyl alcohol) is between 10 and 35% (wt.), preferably between 15 to 25% (wt.). Accordingly the content of PEBAX (polyether block amide) is from 23 to 27% (wt.), preferably from 24 to 26% (wt.). The mixing ratios thus indicated result in a particularly good foodstuff film or sausage casing.

Thus it is provided in a preferred embodiment of the smokable food casing or food casing film for food packagings that its oxygen permeability at a film thickness of 30 μm is in the range from 2.1 $cm^3/m^2$ to 1.0 $cm^3/m^2$, preferably from 1.0 $cm^3/m^2$ to 0.26 $cm^3/m^2$, in a particularly preferred manner less than 0.26 $cm^3/m^2$ within 24 h.

In a further preferred embodiment it is provided that the water vapor permeability is from at least 1 $kg/m^2$ to 100 $kg/m^2$, wherein in a preferred manner it is to be at least 10 $kg/m^2$ to 50 $kg/M^2$ and in a particularly preferred manner between 20 $kg/m^2$ and 30 $kg/m^2$ within 24 h.

Furthermore it is provided that natural smoke or liquid smoke may be used for smoking. The casing or film of the invention may—depending on need and purpose of use, as well as depending on the requirements during the subsequent processing steps—be manufactured while not drawn, unidirectionally drawn, or bidirectionally drawn. The casing or film of the invention may, according to wish, be in a monolayer or multilayer form.

The above discussed object is attained, in terms of method technology, wherein the above discussed advantages and aims may be attained in a synergetic manner.

The table represented hereinbelow contains excerpts from altogether 15 preferred plastic mixtures successfully examined in in-house tests by the applicant, with the mixing proportions being indicated in % (wt.).

| No. | PA 6.66 | PVAL | PEBAX |
|---|---|---|---|
| 1 | 5033 FDX 65% (wt.) | Mowiflex-L745 10% (wt.) | MH 1657 25% (wt.) |
| 2 | 5033 FDX 55% (wt.) | Mowiflex-L745 20% (wt.) | MH 1657 25% (wt.) |
| 3 | 5033 FDX 50% (wt.) | Mowiflex-L 745 25% (wt.) | MH 1657 25% (wt.) |
| 4 | 5033 FDX 45% (wt.) | Mowiflex-L 745 30% (wt.) | MH 1657 25% (wt.) |
| 5 | 5033 FDX 40% (wt.) | Mowiflex-L 745 35% (wt.) | MH 1657 25% (wt.) |
| 6 | 5033 FDX 60% (wt.) | Mowiflex-L745 18% (wt.) | MH 1657 22% (wt.) |

-continued

| No. | PA 6.66 | PVAL | PEBAX |
|---|---|---|---|
| 7 | 5033 FDX 53% (wt.) | Mowiflex-L745 20% (wt.) | MH 1657 27% (wt.) |
| 8 | 5033 FDX 55% (wt.) | Mowiol 8-88 20% (wt.) | MH 1657 25% (wt.) |
| 9 | 5033 FDX 50% (wt.) | Mowiol 8-88 25% (wt.) | MH 1657 25% (wt.) |
| 10 | 5033 FDX 60% (wt.) | Mowiol 8-88 18% (wt.) | MH 1657 22% (wt.) |
| 11 | 5033 FDX 50% (wt.) | Mowiol 8-88 22% (wt.) | MH 1657 28% (wt.) |
| 12 | 5033 FDX 70% (wt.) | Poval OV 170 5% (wt.) | MH 1657 25% (wt.) |
| 13 | 5033 FDX 65% (wt.) | Poval OV 170 10% (wt.) | MH 1657 25% (wt.) |
| 14 | 5033 FDX 63% (wt.) | Poval OV 170 12% (wt.) | MH 1657 25% (wt.) |
| 15 | 5033 FDX 58% (wt.) | Poval OV 170 15% (wt.) | MH 1657 27% (wt.) |

These preferred plastic mixtures and other ones were subjected to a plurality of in-house examinations and test series at the applicant's, in order to determine the plastic mixture (from which the film is then manufactured in the jet-blasting process from the molten plastic material obtained therefrom) to be selected for optimum results for the smokable planar or hose-type food casing or food casing film for food packagings in accordance with the invention, such as, e.g., sausage casings, shrink bags or the like, and in order to be able to ascertain the properties thereby achievable.

The above discussed aspects and advantages of the present invention may best be obtained, while utilizing additional synergy effects, on an apparatus or plant of the present applicant for the manufacture of hose-type food casings or food casing films for food packagings such as, e.g., sausage casings, in the jet-blasting process if additionally the means for rapid cooling of thin thermoplastic hoses following their extrusion as disclosed in the published patent application DE 199 16 428 A1 to the present applicant is employed, or on the other hand the further development thereof in accordance with published patent application DE 100 48 178 A1. Here the hose-type film produced from the molten plastic material in the jet blasting head is subjected to intense cooling during which the amorphous structure of the thermoplastic material from the molten plastic material is preserved. The hose-type film vertically extruded from the molten plastic material in the jet blasting head at first moves, without contacting the wall, into the cooling device for being cooled, as is described in detail in DE 199 16 428 A1 as well as in DE 100 48 178 A1. Concerning details of the techniques, the construction and the operation of this cooling means, also referred to as calibrating means, the contents of the disclosure of DE 199 16 428 A1 and of DE 100 48 178 A1 are herewith fully incorporated by way of reference in order to avoid repetitions. The hose-type film then passes inside the cooling means through supports against which the film supports itself due to a differential pressure between the inside of the hose-type film and the coolant, with a liquid film being preserved between film and supports, whereby adhesion of the hose-type film is precluded. The diameter of the supports has an influence on the diameter of the hose-type film, for which reason these cooling means by the present applicant are also referred to as calibrating means. The above discussed aspects and advantages may be attained best by the combination of the plastic mixture of polyamide with PVAL (polyvinyl alcohol) and PEBAX (polyether block amide) with the jet-blasting process and the subsequent rapid, intense cooling by means of the presently discussed calibrating means.

The present invention thus for the first time furnishes a smokable planar or hose-type food casing or food casing film for food packagings, such as, e.g., sausage casings, shrink bags or the like on a polymer basis, which may be manufactured in the jet-blasting process from a homogeneous molten plastic material consisting of a mixture at least of polyamide with PVAL (polyvinyl alcohol) and PEBAX (polyether block amide). The food casing or food casing film in accordance with the invention for the first time exhibits a water vapor permeability that is at least 1 kg/m$^2$ within 24 h, and at the same time has an oxygen permeability situated at <2.1 cm$^3$/m$^2$ within 24 h at a film thickness of 30 µm. Furthermore the present invention for the first proposes a method for manufacturing it.

The invention claimed is:

1. A smokeable planar or hose-type food casing or food casing for food packagings, on a polymer basis, consisting of the smokeable food casing or food casing film is formed in the jet-blasting process from homogeneous molten plastic material consisting of a plastic mixture of PA (polyamide) with polyvinyl alcohol and polyether block amide, wherein the plastic mixture comprises a content of PA 9polyamide) or of a mixture of polyamides of 40 to 75% (wt.), a content of polyvinyl alcohol of 5 to 40% (wt.), and a content of polyether block amide of 20 to 30% (wt.)

2. The smokeable food casing or food casing film for food packagings in accordance with claim 1, wherein the content of PA (polyamide) is from 45 to 75% (wt.).

3. The smokeable food casing or food casing film for food packagings in accordance with claim 1, wherein the content of polyvinyl alcohol is from 10 to 35% (wt.).

4. The smokeable food casing or food casing film for food packagings in accordance with claim 1, wherein the content of polyether block amide is from 23 to 27% (wt.).

5. The smokeable food casing or food casing film for food packagings in accordance with claim 1, wherein it has a water vapor permeability that is at least 1 kg/m$^2$ within 24 h.

6. The smokeable food casing or food casing film for food packagings in accordance with claim 1, wherein it has a water vapor permeability that is less than 100 kg/m$^2$ within 24 h.

7. The smokeable food casing or food casing film for food packagings in accordance with claim 1, characterized wherein it has a water vapor permeability within 24 h that is at least 10 kg/m$^2$ to 50 kg/m$^2$.

8. The smokeable food casing or food casing film for food packagings in accordance with claim 1, wherein it has an oxygen permeability of less than 2.1 cm$^3$/m$^2$ within 24 h at a film thickness of 30 µm.

9. The smokeable food casing or food casing film for food packagings in accordance with claim 1, wherein it has an oxygen permeability within 24 h at a film thickness of 30 µm in the range from 2.1 cm$^3$/mµ to 1.0 cmµ/m$^2$.

10. The smokeable food casing or food casing film for food packagings in accordance claim 1, wherein the polyamides are selected from a group comprising: polycaprolactame (PA 6), polyhexamethylene adipinamide (PA 66), PA 6/66, PA 11, PA 12, PA 6.12, PA 6/12, PA 6/69, MXD6 (modified polyamide 6), or mixtures of these polyamides or the like.

11. The smokeable food casing or food casing film for food packagings in accordance with claim 1, wherein the casing or film is in a monolayer or multilayer form.

* * * * *

UNITED STATES PATENT AND TRADEMARK OFFICE
CERTIFICATE OF CORRECTION

PATENT NO. : 7,727,604 B2
APPLICATION NO. : 10/557910
DATED : June 1, 2010
INVENTOR(S) : Jürgen Schiffmann It is certified that error appears in the above-identified patent and that said Letters Patent is hereby corrected as shown below:

On the title page delete

Item "(73) Assignee:    Kuhne Antagenbau GmbH, St. Augustin/ Menden (DE)"

and replace with:
Item (73) Assignee:    Kuhne Anlagenbau GmbH, St. Augustin/Menden (DE)

Signed and Sealed this

Sixth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,727,604 B2
APPLICATION NO. : 10/557910
DATED : June 1, 2010
INVENTOR(S) : Jürgen Schiffmann It is certified that error appears in the above-identified patent and that said Letters Patent is hereby corrected as shown below:

Column 6, Claim 7, Line 46
Please delete "charactorized" and insert -- characterized --

Signed and Sealed this

Thirty-first Day of August, 2010

David J. Kappos
*Director of the United States Patent and Trademark Office*